United States Patent
Phillips et al.

(10) Patent No.: US 10,397,376 B2
(45) Date of Patent: Aug. 27, 2019

(54) STREAMING POLICY MANAGEMENT SYSTEM AND METHOD

(71) Applicant: Ericsson AB, Stockholm (SE)

(72) Inventors: Chris Phillips, Hartwell, GA (US); Charles Hammett Dasher, Lawrenceville, GA (US)

(73) Assignee: ERICSSON AB, Stockholm (SE)

( * ) Notice: Subject to any disclaimer, the term of this patent is extended or adjusted under 35 U.S.C. 154(b) by 349 days.

(21) Appl. No.: 15/443,031

(22) Filed: Feb. 27, 2017

(65) Prior Publication Data

US 2017/0171360 A1    Jun. 15, 2017

Related U.S. Application Data

(63) Continuation of application No. 14/024,301, filed on Sep. 11, 2013, now Pat. No. 9,584,573.

(51) Int. Cl.
*G06F 15/16* (2006.01)
*H04L 29/06* (2006.01)
(Continued)

(52) U.S. Cl.
CPC ............ *H04L 69/03* (2013.01); *H04L 47/806* (2013.01); *H04L 65/4084* (2013.01);
(Continued)

(58) Field of Classification Search
CPC ... H04L 69/03; H04L 47/806; H04L 65/4084; H04L 65/60; H04L 65/604; H04L 67/04;
(Continued)

(56) References Cited

U.S. PATENT DOCUMENTS

| | | |
|---|---|---|
| 8,346,959 B2 | 1/2013 | Deshpande |
| 8,549,570 B2 | 10/2013 | Forsman et al. |

(Continued)

FOREIGN PATENT DOCUMENTS

| | | |
|---|---|---|
| CA | 101146032 A | 3/2008 |
| CN | 1538707 A | 10/2004 |

(Continued)

OTHER PUBLICATIONS

"Extended Display Identification Data", Retrieved Dec. 10, 2013, from http://en.wikipedia.org/wiki/Extended_display_identification_data.

(Continued)

*Primary Examiner* — Jonathan A Bui

(57) ABSTRACT

A streaming policy management system and method wherein bandwidth may be allocated based on external device information received from a streaming client device connected to one or more external audio/video (A/V) devices. When a streaming network back office receives a request from the streaming client device for delivery of a particular content, wherein the request includes external device information of one or more external A/V devices connected to the streaming client device, a bandwidth is determined for streaming the particular content to the streaming client device and a request may be made to a content delivery network to create a distribution pipe having the bandwidth to accommodate the delivery of the particular content. A manifest file is provided to the streaming client device that includes one or more pointers that point to content segments of the particular content.

8 Claims, 10 Drawing Sheets

(51) Int. Cl.
*H04L 29/08* (2006.01)
*H04N 21/258* (2011.01)
*H04N 21/262* (2011.01)
*H04N 21/2662* (2011.01)
*H04N 21/854* (2011.01)
*H04L 12/927* (2013.01)

(52) U.S. Cl.
CPC ............ *H04L 65/60* (2013.01); *H04L 65/604* (2013.01); *H04L 67/04* (2013.01); *H04L 67/303* (2013.01); *H04L 67/306* (2013.01); *H04N 21/25825* (2013.01); *H04N 21/25833* (2013.01); *H04N 21/25858* (2013.01); *H04N 21/2662* (2013.01); *H04N 21/26258* (2013.01); *H04N 21/85406* (2013.01)

(58) Field of Classification Search
CPC ................ H04L 67/303; H04L 67/306; H04N 21/25825; H04N 21/25833; H04N 21/25858; H04N 21/26258; H04N 21/2662; H04N 21/85406
See application file for complete search history.

(56) References Cited

U.S. PATENT DOCUMENTS

| | | | |
|---|---|---|---|
| 2006/0083434 A1* | 4/2006 | Inata | H04N 21/23113 382/232 |
| 2007/0153916 A1 | 7/2007 | Demircin et al. | |
| 2008/0285574 A1 | 11/2008 | Teener | |
| 2009/0063703 A1* | 3/2009 | Finkelstein | G06F 16/4393 709/240 |
| 2009/0233587 A1 | 9/2009 | Muhonen et al. | |
| 2010/0031366 A1 | 2/2010 | Knight et al. | |
| 2010/0235520 A1* | 9/2010 | Attanasio | H04M 3/42374 709/228 |
| 2011/0179185 A1 | 7/2011 | Wang et al. | |
| 2011/0252082 A1 | 10/2011 | Cobb et al. | |
| 2011/0310216 A1 | 12/2011 | Lee et al. | |
| 2012/0054312 A1 | 3/2012 | Salinger | |
| 2012/0117632 A1 | 5/2012 | Curtis et al. | |
| 2012/0192230 A1 | 7/2012 | Algie et al. | |
| 2012/0203822 A1 | 8/2012 | Floyd et al. | |
| 2012/0222063 A1* | 8/2012 | Mao | H04N 7/17318 725/31 |
| 2012/0259946 A1 | 10/2012 | Stockhammer et al. | |
| 2012/0314713 A1 | 12/2012 | Singh et al. | |
| 2013/0086279 A1 | 4/2013 | Archer et al. | |
| 2013/0145406 A1* | 6/2013 | Baskaran | H04N 21/2396 725/87 |
| 2013/0207943 A1 | 8/2013 | Imai et al. | |
| 2014/0006635 A1 | 1/2014 | Braness et al. | |
| 2014/0040496 A1* | 2/2014 | Moorthy | H04L 65/4084 709/231 |
| 2014/0068076 A1 | 3/2014 | Dasher et al. | |
| 2014/0082661 A1* | 3/2014 | Krahnstoever | H04N 21/435 725/32 |
| 2014/0129738 A1 | 5/2014 | Hussain | |
| 2014/0165120 A1 | 6/2014 | Losev et al. | |
| 2014/0226026 A1 | 8/2014 | Claramond et al. | |
| 2014/0226561 A1 | 8/2014 | Kim et al. | |
| 2014/0253413 A1 | 9/2014 | Nair et al. | |
| 2014/0280764 A1 | 9/2014 | Dasher et al. | |
| 2014/0281002 A1 | 9/2014 | Sun | |
| 2014/0281009 A1 | 9/2014 | Moorthy et al. | |
| 2014/0310424 A1 | 10/2014 | Andersson et al. | |
| 2014/0327833 A1 | 11/2014 | Kabuto | |
| 2015/0023404 A1 | 1/2015 | Li et al. | |
| 2015/0046939 A1 | 2/2015 | Oliver | |

FOREIGN PATENT DOCUMENTS

| | | |
|---|---|---|
| CN | 101800885 A | 8/2010 |
| CN | 102067529 A | 5/2011 |
| CN | 102474709 A | 5/2012 |
| CN | 102948148 A | 2/2013 |
| EP | 2 472 486 A1 | 7/2012 |
| EP | 2472406 A1 | 7/2012 |

OTHER PUBLICATIONS

Quantum Data: "Ensuring Interoperability in EDID implementations". A white Paper by Quantum Data, Inc., 9 pages.

* cited by examiner

STREAMING POLICY MANAGEMENT SYSTEM AND METHOD

PRIORITY CLAIM

This application is a continuation of pending U.S. patent application Ser. No. 14/024,301 filed Sep. 11, 2013. The contents of these documents are hereby incorporated by reference herein.

CROSS-REFERENCE TO RELATED APPLICATION(S)

This application discloses subject matter that is related to the subject matter of the following U.S. patent application(s): (i) "BANDWIDTH MANAGEMENT FOR OVER-THE-TOP ADAPTIVE STREAMING" (Ericsson Ref. No.: P39592-US1), application Ser. No. 13/845,320, filed Mar. 18, 2013 in the name(s) of Christopher Phillips et al., (ii) "REGULATING CONTENT STREAMS FROM A WEIGHTED FAIR QUEUING SCHEDULER USING WEIGHTS DEFINED FOR USER EQUIPMENT NODES" (Ericsson Ref. No.: P37772-US1), application Ser. No. 13/597333, filed Aug. 29, 2012, in the name(s) of Christopher Phillips et al., (iii) "METHODS AND APPARATUS FOR MANAGING NETWORK RESOURCES USED BY MULTIMEDIA STREAMS IN A VIRTUAL PIPE" (Ericsson Ref. No.: P36357-US1), application Ser. No. 13/403075, filed Feb. 23, 2012, in the name(s) of Christopher Phillips et al., and (iv) "METHODS, APPARATUS, AND COMPUTER PROGRAM PRODUCTS FOR ALLOCATING BANDWIDTH FOR PUSH AND PULL CONTENT REQUESTS IN A CONTENT DELIVERY NETWORK" (Ericsson Ref. No.: P39663-US1), application Ser. No. 13/856,895, filed Apr. 4, 2013, in the name(s) of Christopher Phillips et al., each of which is hereby incorporated by reference in its entirety.

FIELD OF THE DISCLOSURE

The present disclosure generally relates to communication networks. More particularly, and not by way of any limitation, the present disclosure is directed to a system and method for effectuating streaming policy management in adaptive streaming networks.

BACKGROUND

A content delivery network or CDN (sometimes also referred to as a content distribution network) typically distributes content in a "best effort" fashion across the nodes throughout a network using technologies such as adaptive bitrate (ABR) streaming. It is known, however, that ABR can result in unfair and sometimes incongruous apportionment of bandwidth on a network based upon the order multiple clients begin to use a network resource. Since the bandwidth usage is typically determined by a client requesting the content, and because the ABR clients can be opportunistic, they may become greedy. For instance, a client device that has a low resolution (e.g., a cellular phone) may end up consuming a disproportionate amount of the bandwidth when compared to the bandwidth required for a higher resolution device such as, e.g., a high-definition TV (HDTV). Issues pertaining to such misappropriation of bandwidth are expected to become even more pronounced when higher bandwidth options become available. Relatedly, CDNs are also afflicted with issues relative to congestion at different nodes.

SUMMARY

The present patent disclosure is broadly directed to a streaming policy management system and method wherein bandwidth may be allocated based on the capabilities of external audio/visual (A/V) devices that may be connected to a streaming client device. One or more embodiments disclosed herein allow client devices that are connected to external A/V devices (also sometimes referred to as "external rendering devices" or "remote rendering devices" for purposes of the present patent application) to transmit the display capabilities (e.g., resolution, etc.) of the external A/V devices to a content provider service. A back office streaming policy manager is configured to utilize such information in determining a suitable bandwidth policy and assign appropriate priorities/weights for streaming the content requested by the user. Accordingly, one or more embodiments of the present disclosure may be implemented to ensure that correct content streams are delivered for rendering at actual rendering devices connected to the streaming client device while conserving the bandwidth (e.g., by reducing inefficient bandwidth usage) in the delivery network.

In one aspect, an embodiment of a method performed by a streaming client device is disclosed. The claimed embodiment comprises obtaining external device information from one or more external A/V devices connected to the streaming client device; and registering with a subscriber policy management system to add the external device information of the one or more external A/V devices in a subscriber profile associated with the streaming client device in order to enable or otherwise facilitate a streaming content policy server to determine a bandwidth and/or related policy for streaming a particular content to the streaming client device based at least in part upon the external device information when the particular content is requested by the streaming client device. In one variation, the external device information is further operative for assigning a specific priority weight by the streaming content policy server with respect to streaming the particular content to the streaming client device. In another variation, the external device information is further operative for determining an appropriate version of the particular content to be delivered to the streaming client device.

In another aspect, an embodiment of an adaptive streaming method for delivering content to a streaming client device is disclosed. The claimed embodiment comprises, inter alia, receiving a request from the streaming client device for delivery of a particular content, wherein the request includes external device information of one or more external A/V devices connected to the streaming client device. In the context of ABR streaming, the particular content may be available in a plurality of versions or formats encoded at different bit rates. The claimed embodiment further includes determining, based at least in part upon the external device information, a bandwidth and/or related policy for streaming the particular content to the streaming client device. A request may be made to a content delivery network to create a distribution pipe having the bandwidth to accommodate the delivery of the particular content to the streaming client device. A manifest file is provided to the streaming client device that includes the encoding bit rates and one or more pointers that point to content segments of the particular content. The manifest file information is used by the streaming client device to retrieve the content segments via the provisioned distribution pipe, which are then decoded and rendered at a select display device. In one implementation, the decoded content may be rendered at an external A/V device having a high resolution or HD display capability. In such an implementation, the distribution pipe may be provisioned with no bandwidth capacity limitation. In another implementation, the decoded content may be rendered at a built-in display included within the streaming client device, wherein a maximum bandwidth capacity limitation may be applied to the distribution pipe.

In yet another aspect, an embodiment of a client device is disclosed that comprises one or more processors and a streaming client module coupled to the one or more processors. The streaming client module may be configured to perform an embodiment of a method described hereinabove at least for purposes of providing external device information of connected A/V devices to a streaming network or operator back office. In still further aspects, an embodiment of a non-transitory computer-readable medium containing instructions stored thereon is disclosed for performing one or more embodiments of the methods set forth above.

Advantages of the present invention include, but not limited to, optimizing bandwidth for clients requesting adaptive streaming of media content depending upon the external A/V devices that may connected to the client device. Such bandwidth optimization may be modulated based on operator policies, content provider policies, subscriber profiles, etc. For example, even if a small form-factor client device such as a smartphone or tablet is capable of HD display, an operator might not want to waste bandwidth by streaming HD content only to be rendered locally since the client device is not connected to a large form-factor HD display device. Accordingly, it will be appreciated that one or more embodiments of the present disclosure may be configured such that only appropriate content streams are delivered for rendering at the actual rendering devices while conserving the overall bandwidth (e.g., by reducing inefficient bandwidth usage) in the delivery network. Further features of the various embodiments are as claimed in the dependent claims. Additional benefits and advantages of the embodiments will be apparent in view of the following description and accompanying Figures.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

DETAILED DESCRIPTION OF THE DRAWINGS

Figure 1:
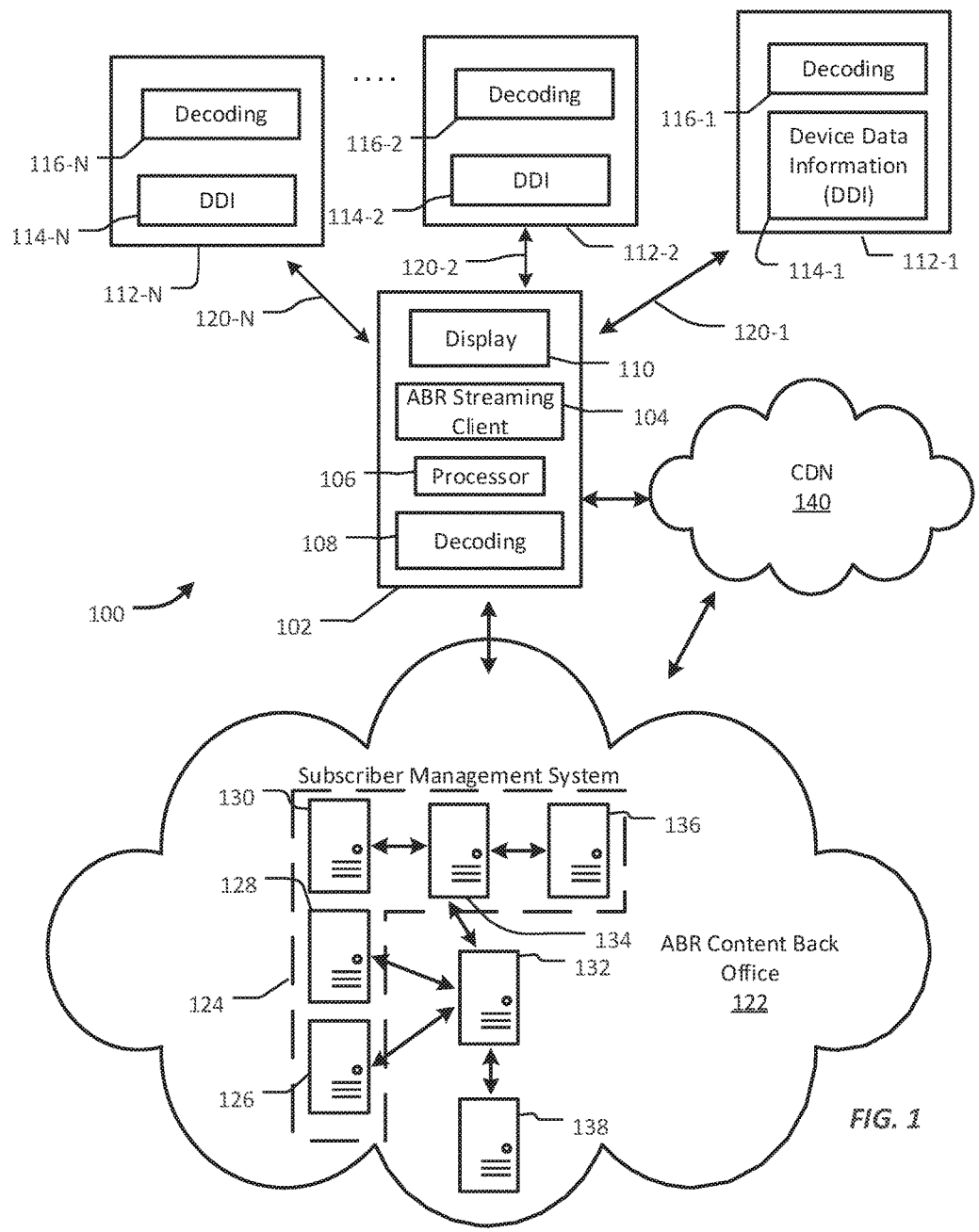
FIG. 1 depicts an example streaming network environment including a content delivery network and a streaming network back office wherein one or more embodiments of the present patent application may be practiced.

In the following description, numerous specific details are set forth with respect to one or more embodiments of the present patent disclosure. However, it should be understood that one or more embodiments may be practiced without such specific details. In other instances, well-known circuits, subsystems, components, structures and techniques have not been shown in detail in order not to obscure the understanding of the example embodiments. Accordingly, it will be appreciated by one skilled in the art that the embodiments of the present disclosure may be practiced without such specific components. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element is capable of performing or otherwise structurally arranged to perform that function.

As used herein, a network element may be comprised of one or more pieces of service network equipment, including hardware and software that communicatively interconnects other equipment on a network (e.g., other network elements, end stations, etc.), and is adapted to host one or more applications or services with respect to a plurality of subscribers. Some network elements may comprise "multiple services network elements" that provide support for multiple network-based functions (e.g., A/V media management, session control, QoS policy enforcement, bandwidth scheduling management, subscriber/device policy and profile management, content provider priority policy management, streaming policy management, and the like), in addition to providing support for multiple application services (e.g., data and multimedia applications). Subscriber end stations or client devices may comprise any device configured to execute, inter alia, a streaming client application (e.g., an ABR streaming client application) for receiving content from a content provider. Accordingly, such client devices may include set-top boxes, PVR/DVRs, workstations, laptops, netbooks, palm tops, mobile phones, smartphones, multimedia phones, Voice Over Internet Protocol (VOIP) phones, mobile/wireless user equipment, high definition TV terminals, portable media players, location-aware subscriber equipment, gaming systems or consoles (such as the Wii®, Play Station 3®, Xbox 360®), etc., that may access or consume content/services provided over a content delivery network in accordance with one or more embodiments set forth herein. Further, the client devices may also access or consume content/services provided over broadcast networks (e.g., cable and satellite networks) as well as a packet-switched wide area public network such as the Internet via suitable service provider access networks. In a still further variation, the client devices or subscriber end stations may also access or consume content/services provided on virtual private networks (VPNs) overlaid on (e.g., tunneled through) the Internet.

One or more embodiments of the present patent disclosure may be implemented using different combinations of software, firmware, and/or hardware. Thus, one or more of the techniques shown in the Figures (e.g., flowcharts) may be implemented using code and data stored and executed on one or more electronic devices or nodes (e.g., a subscriber client device or end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present disclosure.

Referring now to the drawings and more particularly to FIG. 1, depicted therein is an example streaming network environment 100 including a content delivery network or content distribution network (CDN) 140 and a streaming network back office 122 wherein one or more embodiments of the present patent application may be practiced. For purposes of the present patent application, CDN 140 may comprise an overlay network architected for high-performance streaming of a variety of digital assets or program assets as well as services (hereinafter referred to as "content") to subscribers using one or more Internet-based infrastructures, private/dedicated infrastructures or a combination thereof. In general, the terms "content" or "content file" as used in reference to at least some embodiments of the present patent disclosure may include digital assets and program assets such as any type of audio/video content or program segment, streaming or static (e.g., recorded over-the-air free network television (TV) shows or programs, pay TV broadcast programs via cable networks or satellite networks, free-to-air satellite TV shows, IPTV programs, etc.), Over-The-Top (OTT) and video-on-demand (VOD) or movie-on-demand (MOD) shows or programs, time-shifted TV (TSTV) content, as well as other content assets provided by content publishers, owners or providers, including but not limited to software files, executable computer code or programs, online electronic games, Internet radio shows/programs, entertainment programs, educational programs, movies, music video programs, and the like, that may be delivered using any known or heretofore unknown streaming technologies. By way of illustration, content may be delivered via CDN 140 using adaptive bit rate (ABR) streaming techniques and may be encoded to support Microsoft® Silverlight® Smooth Streaming, HTTP streaming (for instance, Dynamic Adaptive Streaming over HTTP or DASH, HTTP Live Streaming or HLS, HTTP Dynamic Streaming or HDS, etc.), Icecast, and so on. In general, the overlay architecture of CDN 140 may include a multi-level, hierarchically-organized interconnected assembly of network servers for providing media pathways or "pipes" from one or more central distribution nodes to one or more levels of regional distribution nodes that are connected to one or more local edge servers configured to serve a plurality of end users or subscribers in respective serving location areas. In addition to such "distribution servers" (sometimes also referred to as "surrogates"), CDN 140 may also include and/or interoperate with various network elements configured to effectuate request redirection or rerouting mechanisms as well as related back office systems such as subscriber management systems, bandwidth scheduling systems, account/billing systems and the like, that may be deployed as part of the associated streaming network back office 122. As illustrated, an example subscriber management system 124 deployed in the back office 122 may include an operator pipe and content policy node 126, a subscriber device profile and priority definition node 128, in addition to a streaming policy server node 134, a billing node 130 and a subscriber authentication node 136. A bandwidth decision manager 132 and a weighted fair queuing (WFQ) scheduler 138 may be configured to use data from the operator pipe and content policy node 126 and the subscriber device profile and priority node 128 to regulate bandwidth allocated to the CDN distribution pipes for carrying groups of content streams to the subscribers. Additional details with respect to allocating bandwidth on an outgoing CDN distribution pipe based on weights and priority levels associated with subscriber devices, content-based policies, dynamic resizing of the pipes using, e.g., one or more pipe control nodes, and scheduling based on WFQ techniques, may be found in one or more of the following commonly owned co-pending U.S. patent application(s): (i) "BANDWIDTH MANAGEMENT FOR OVER-THE-TOP ADAPTIVE STREAMING" (Ericsson Ref. No.: P39592-US1), application Ser. No. 13/845,320, filed Mar. 18, 2013, in the name(s) of Christopher Phillips et al., (ii) "REGULATING CONTENT STREAMS FROM A WEIGHTED FAIR QUEUING SCHEDULER USING WEIGHTS DEFINED FOR USER EQUIPMENT NODES" (Ericsson Ref. No.: P37772-US1), application Ser. No. 13/597333, filed Aug. 29, 2012, in the name(s) of Christopher Phillips et al., (iii) "METHODS AND APPARATUS FOR MANAGING NETWORK RESOURCES USED BY MULTIMEDIA STREAMS IN A VIRTUAL PIPE" (Ericsson Ref. No.: P36357-US1), application Ser. No. 13/403075, filed Feb. 23, 2012, in the name(s) of Christopher Phillips et al., and (iv) "METHODS, APPARATUS, AND COMPUTER PROGRAM PRODUCTS FOR ALLOCATING BANDWIDTH FOR PUSH AND PULL CONTENT REQUESTS IN A CONTENT DELIVERY NETWORK" (Ericsson Ref. No.: P39663-US1), application Ser. No. 13/856,895 filed Apr. 4, 2013, in the name(s) of Christopher Phillips et al., cross-referenced hereinabove and hereby incorporated by reference herein.

Continuing to refer to FIG. 1, reference numeral 102 refers to an example client device or user equipment (UE) device associated with a subscriber/customer for consuming content delivered via CDN 140 in any type or number of access technologies including broadband access via wired and/or wireless (radio) communications. For purposes of the present patent application, the terms "streaming client device" and "client device" may be used synonymously and may comprise any UE device or appliance that in one implementation not only receives program assets for live viewing, playback and/or decoding the content, but also operates as a command console or terminal that can accept user inputs, commands or requests to interact with a network element disposed in CDN 140 and/or the associated back office 122 for requesting content that may be selectively rendered at one or more external audio/visual (A/V) devices 112-1 to 112-N. As such, UE device 102 may include one or more streaming client modules 104 (e.g., an ABR streaming client) and associated decoding functionalities 108 depending on the streaming technologies implemented, each operating in association with a processor module 106. An optional local display 110 (which may also be referred to as an internal or included display) may have the capability to render the video content in one or more resolutions (e.g., standard definition such as 480 i, enhanced definition such as 480 p, or high definition such as 720 p and up). Further, as will be described in additional detail hereinbelow, the client device 102 includes appropriate structures and modules for obtaining identity information, capabilities information, etc. from the external A/V devices 112-1 to 112-N that may be used by the subscriber policy management system 124 for selecting and/or provisioning appropriate bandwidth with respect to streaming a particular content program requested by the subscriber.

By way of further illustration, external A/V devices 112-1 to 112-N may comprise media rendering devices such as one or more high definition TV (HDTV) monitors with 1080 i/1080 p resolutions, one or more ultra high definition TV (UHDTV) monitors with 2160 p, 4320 p or 8640 p resolutions, 3D TV monitors, HD/UHD video/cinema projectors, HD/UHD computer monitors, HD/3D Blu-ray Disc (BD) players, and auxiliary gaming/home entertainment displays, etc., that may be connected or communicatively coupled to the client device 102 via any suitable wired or wireless technologies. Accordingly, reference numerals 120-1 to 120-N are illustrative of communication links between the client device 102 and the respective external A/V devices (which sometimes may also be referred to as "external rendering devices" or "connected display devices") that may comprise High-Definition Media Interface (HDMI) connections, Digital Visual Interface or Digital Video Interface (DVI) connections, FireWire connections, HD wireless connections utilizing unlicensed radio frequencies in 5 GHz, 60 GHz or 190 GHz bands, wireless HDTV (also referred to as WiDi) connections, Wireless Home Digital Interface (WHDI) connections, Digital Living Network Alliance (DLNA)-compliant connections, as well as other proprietary connections such as Apple® AirPlay connections, and the like. Depending on the functionality, an external A/V device may or may not include a decoding capability, and may or may not include both audio and video rendering capabilities. For purposes of illustration, external A/V devices 112-1 to 112-N are each exemplified with respective decoder blocks 116-1 to 116-N. Additionally, blocks 114-1 to 114-N are illustrative of storage areas of respective external A/V devices 112-1 to 112-N that contain device data information (DDI) including device identity information, rendering/decoding capabilities information and other information (collectively referred to as "external device information" or "metadata"). One skilled in the art will recognize that storage areas 112-1 to 112-N may be implemented in a number of ways including but not limited to, using persistent memory such as built-in or integrated read-only memory (ROM) circuits, erasable programmable read-only memory (EPROM) circuits, Flash memory circuits, as well as external memory cards, and the like, wherein the device data may be downloaded, uploaded, updated, and/or reconfigured by third-party device vendors, via wireless means (over-the-air, for example) or over the Internet.

In general operation, the client device 102 and associated CDN and back office infrastructure 122/140 may be configured to effectuate adaptive streaming of content as follows. Initially, source content is transcoded or otherwise encoded with different bit rates (e.g., multi-rate transcoding). For example, a particular content may be transcoded into five video files using variable bit rates, ranging from low to high bit rates. The particular content is therefore encoded as five different "versions" or "formats", wherein each bit rate is called a profile or representation. The encoded content is divided into fixed duration segments or chunks, which are typically between two and ten seconds in duration. One skilled in the art will recognize that shorter segments may reduce coding efficiency whereas larger segments may impact the adaptability to changes in network throughput and/or fast changing client behavior. Regardless of the chunk size, the segments may be Group-of-Pictures (GOP)-aligned such that all encoding profiles have the same segments. A suitable Manifest File is then created that describes the encoding rates and Universal Resource Locator (URL) pointers the various segments of encoded content. In one implementation, the Manifest File (MF), a Delivery Format (DF) and means for conversion from/to existing File Formats (FF) and Transport Streams (TS) may be provided to the client device 102, which uses HTTP to fetch the encoded segments from the content provider network. The received segments may be buffered, as needed, and decoded and played back (i.e., rendered) in sequence, either at the local display 110 or at any one or several of the external A/V devices (112-1 to 112-N). The ABR streaming client module 104 may be designed to select an optimum profile of each segment so as to maximize quality without risking buffer underflow and stalling (i.e., rebuffering) of the play-out. Each time the client device 102 fetches a segment, it may choose the profile based on the measured time to download the previous one or several segments. Additionally, the client device 102 is operable to provide the external A/V device information to the back office infrastructure 122 in order to enable or facilitate a management node, e.g., a streaming policy server, along with a bandwidth scheduler, to effectuate a number of streaming policy management operations in accordance with the teachings herein, such as, e.g., determining, provisioning and allocating a bandwidth or setting a bandwidth capacity limitation, determining/assigning a suitable priority weights for streaming requested content, determining an appropriate version of the particular content program for streaming, creating appropriate content guides, and the like.

Figure 2:
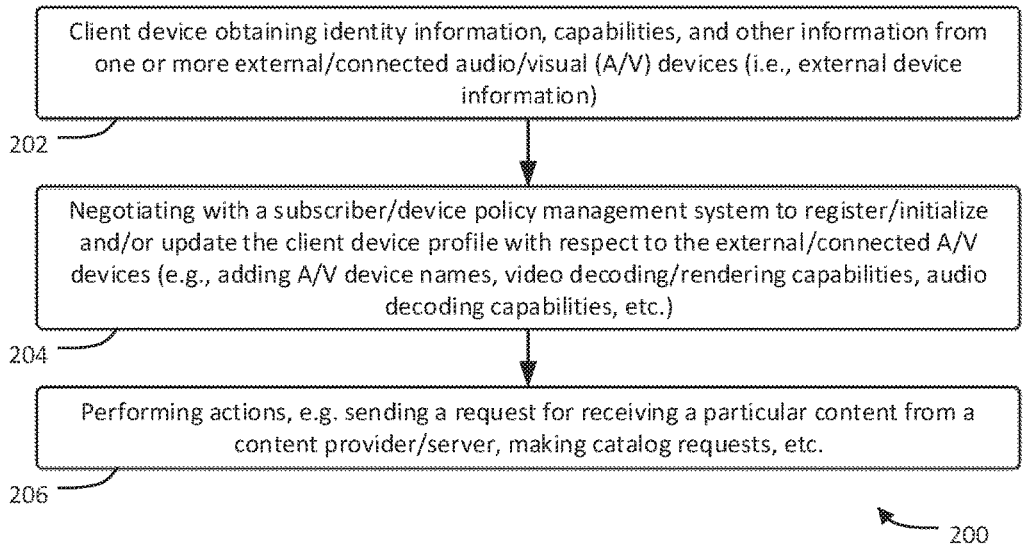
FIG. 2 depicts a flowchart of an example method of providing external device information by a streaming client device to the streaming network back office according to an embodiment of the present patent disclosure.

FIG. 2 depicts a flowchart of an example scheme or process 200 for providing external device information by a streaming client device, e.g., client device 102, to the streaming network back office 122 according to an embodiment of the present patent disclosure. At block 202, the client device 102 is operative to obtain the external A/V device information from the connected external A/V devices 112-1 to 112-N in a number of ways depending on, for example, the A/V device type, functionality, connectivity to the client device 102, and the like. In one embodiment where the A/V device is connected to the client device 102 using HDMI (e.g., HDMI 1.0/1.2/1.2a/1.3a) or other broadband technology operative for transmission of high definition A/V information, appropriate logic structure executing on the client device 102 may perform a request mechanism with the external A/V device to obtain the information. In another embodiment, the external device information may be pushed to the client device 102 when a new A/V device is connected or when the device information is updated for an existing A/V device, and/or based on some other user-defined or operator-defined triggering event. In a still further embodiment, the client device 102 may periodically interrogate and/or poll for the connected A/V devices and obtain the external device information accordingly. In a still further embodiment, the client device 102 may receive the external device information via protocols such as Bonjour, Universal Plug and Play (UPnP) or AirPlay protocols that support device/service discovery, address assignment, hostname resolution, and the like. It should therefore be realized that the client device 102 may obtain external device information for a connected A/V device in one manner and for another connected A/V device in another manner. Furthermore, similar protocols and/or communication links may be used by the client device 102 for transmitting decoded video/content signals to the external A/V devices for rendering thereat as will be described below.

In one implementation, the external A/V device information may comprise Extended Display Identification Data (EDID) information, which may be implemented as a data structure that describes the A/V device capabilities to a source device, e.g., the client device 102. The EDID information may include the A/V device's manufacturer name, serial number, product type, phosphor type, filter type, supported A/V decoding and format information, display timing information, display screen size, display screen aspect ratio, luminance data and pixel mapping data, among other pieces of information. Accordingly, the EDID information or metadata is operative to indicate to the client device 102 whether the associated external A/V device is capable of rendering video in a higher resolution, e.g., HD or UHD, and/or in 3D, for example. Upon obtaining the external device information, the client device 102 is configured to negotiate with the subscriber policy management system 124 to add, initialize, register, and/or update a client device profile of the user/subscriber at a subscriber/device profile database node (e.g., node 128 in FIG. 1) such that one or more external A/V devices 112-1 to 112-N along with their respective capabilities may be configured for the user/subscriber of the client device 102. In addition to the client device's own native capabilities, priority weights, management/operator-related subscriber policies, etc., the subscriber policy management system 124 is therefore also provided with information relative to the external A/V device names, video decoding/rendering capabilities, audio decoding/rendering capabilities, and the like. One skilled in the art should recognize that the negotiation process(es) set forth herein for registering/adding the external device data to a back office subscriber policy management system may be effectuated at the time of initial registration by a new client device or at any other time thereafter. For instance, the client device 102 may be configured to update the subscriber profile database 128 each time a new external A/V device is discovered. In another variation, the client device 102 may update the subscriber profile database 128 when an existing A/V device obtains updated EDID information. In a still further variation, the client device 102 may be configured to transmit the external A/V device information when the client device 102 is not engaged in a streaming session. Furthermore, the client device 102 may also be configured to update the external A/V device information in the subscriber profile database 128 while engaged in a streaming session such that the ongoing session may be rendered at a different rendering site than the current rendering site, either of which may potentially comprise another external A/V device. Accordingly, it should be apparent that any of the foregoing negotiation processes may be implemented in several different combinations and may be encompassed in the functionalities set forth at block 204. Further, normal client device operations such as requesting particular content titles, sending catalog requests for obtaining categories of available content from one or more content providers (e.g., titles available in HD, UHD or 3D, or titles compatible with a particular type of A/V device, and the like), etc. may also take place (block 206), along side or separate from the foregoing processes.

Figure 3:
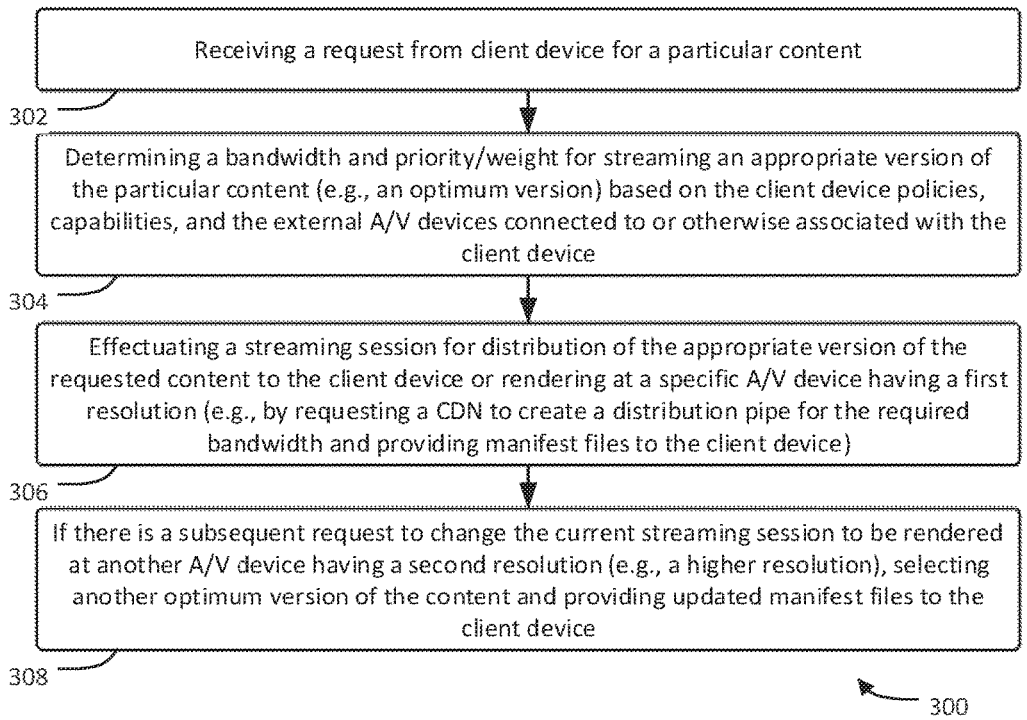
FIG. 3 depicts a flowchart of an example adaptive streaming method for delivering content to a streaming client device based on the external device information provided by the streaming client device according to an embodiment of the present patent disclosure.

FIG. 3 depicts a flowchart of an example adaptive streaming method 300 for delivering content to a streaming client device (e.g., the client device 102) based on the external A/V device information provided by the streaming client device according to an embodiment of the present patent disclosure. When a request from the client device 102 for a particular content is received at the back office (block 302), one or more streaming policy management operations may be effectuated responsive at least in part to the external A/V device information. In an additional or alternative variation, the request for the content delivery may follow a request for catalog of content media by the client device. In a further variation, the request for a particular content may also include a preference indication for specific A/V device for rendering. In yet another implementation, where no external A/V device information is explicitly included in the content delivery request, a subscriber/device profile (e.g., profile database 128 of the back office) may be interrogated to determine what the connected A/V devices are, if any, and their respective rendering capabilities. In a still further variation, the request may also include an indication or the identity of a particular A/V device that the client device 102 wants to use for rendering the content.

In one aspect, a bandwidth policy may be implemented (e.g., for a WFQ scheduling mechanism) based on the external A/V device information to determine, provision and/or allocate a bandwidth, responsive to where the particular content may be rendered. Such a policy may indicate a "No Bandwidth Limitation" policy (e.g., for the content to be rendered at higher resolutions) or where a maximum bandwidth capacity limitation is set (e.g., for the content to be rendered at lower resolutions). Additionally, a suitable priority weight may also be assigned and/or determined based on the A/V device information as well as the content type is being requested (e.g., HD and/or 3D content). In a still further aspect, an optimum version/format of the content may be determined or selected based on the external A/V device capabilities in conjunction with the capabilities of the client device. Operations set forth at block 304 are deemed to encompass at least the foregoing actions and/or determinations.

In one example, if the client device 102 is connected to a high resolution external A/V device and the requested content is to be rendered at such a device, an optimal version of the content (file type, bit rate, resolution, etc.) may be selected and appropriate bandwidth for handling delivery of such version may be provisioned in the CDN. Further, manifest files containing encoding bit rates and URL pointers to the content segments of the selected optimum version are provided to the client device 102 for effectuating the adaptive streaming session, as set forth at block 306. In a further variation, if the client device 102 generates a subsequent request to change the current rendering device for an ongoing streaming session, e.g., to another A/V device having a higher resolution, the back office mechanism is configured to select a different optimum version of the content more suited to the second A/V device (block 308).

It will be recognized by one skilled in the art that the foregoing client device operations and back office operations may be augmented, supplemented, modified and/or implemented in a number of ways, as will be described in further detail below with reference to additional flowcharts. Accordingly, numerous additional and/or alternative embodiments may be realized in accordance with the teachings of the present patent application wherein the blocks illustrated in FIGS. 2 and 3 may be replaced, revised, reconfigured or otherwise rearranged in conjunction with one or more steps, acts, functions and blocks illustrated in the subsequent Figures.

Figure 4:
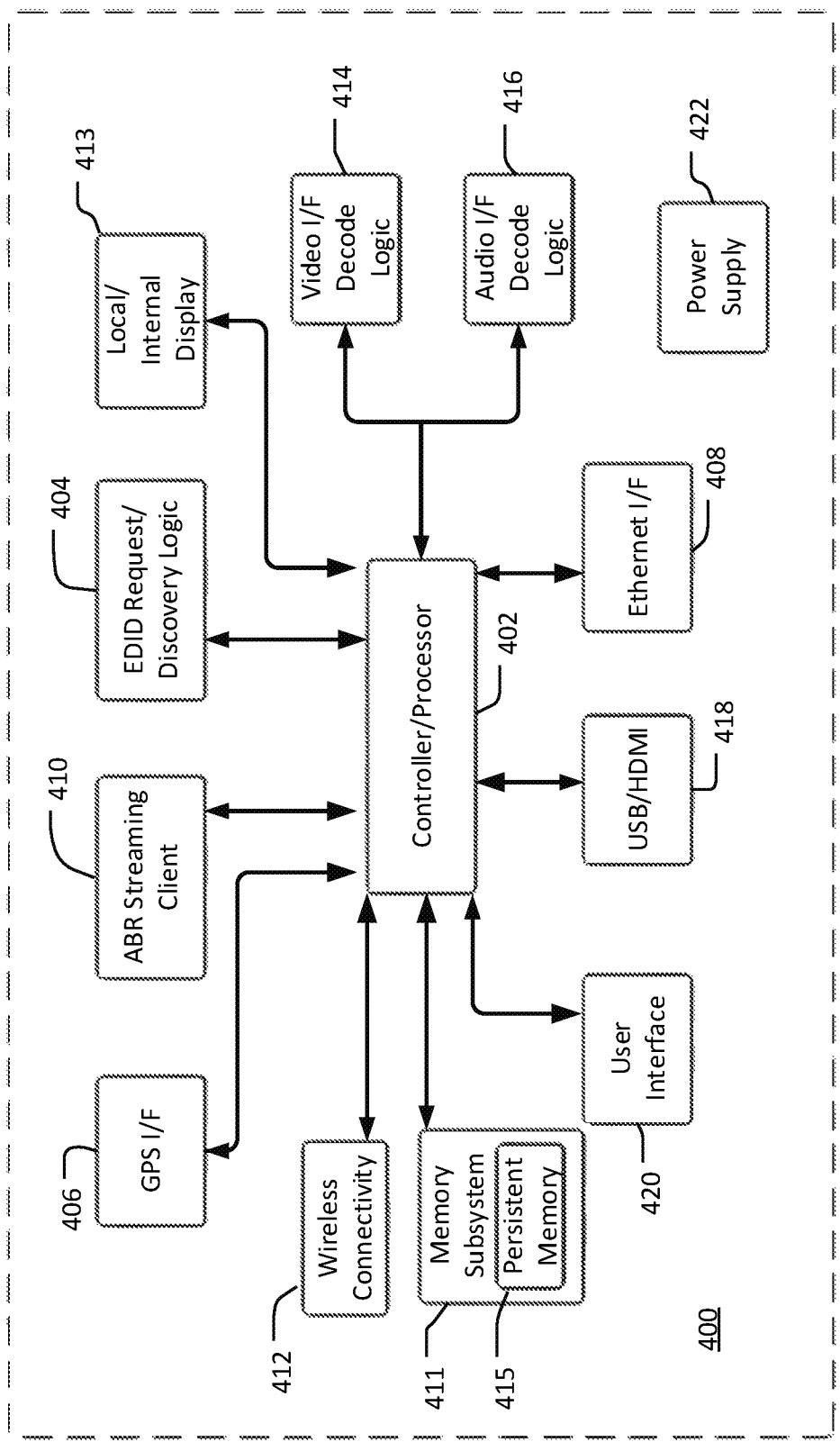
FIG. 4 depicts a block diagram of an example streaming client device according to one embodiment.

Referring now to FIG. 4, depicted therein is a block diagram of an example streaming client device 400 according to an embodiment of the present patent application. It should be appreciated that the streaming client device 400 is a UE device that is generally representative of the subscriber/client device 102 illustrated in FIG. 1, and may include appropriate hardware/software components and subsystems that may augment or otherwise rearrange the blocks shown as part of the client device 102. Broadly, such hardware/software components and subsystems may be configured for performing any of the device-side processes (either individually or in any combination thereof) described hereinabove, which may be rearranged when taken in view of one or more processes described below. A processor module 402 including one or more microcontrollers/processors is provided for the overall control of the client UE device 400 and for the execution of various stored program instructions embodied in a persistent memory 415 that may be part of a memory subsystem 411 of the device 400. Controller/processor complex referred to by reference numeral 402 may also be representative of other specialty processing modules such as graphic processors, video processors, digital signal processors (DSPs), and the like, operating in association with suitable video and audio interfaces 414, 416 for receiving/transmitting content data, which interfaces may include or operate in conjunction with appropriate tuners, demodulators, descramblers, MPEG decoders/demuxes. For example, the client device 400 may be configured to operate with a number of known audio formats (e.g., MP3, AAC, AAC+, eAAC+, FLAC WMA, WAV, AMR, OGG, DTS, AC3, LPCM and MIDI) as well as video formats such as, e.g., MPEG4, H.263, H.264, DivX, XviD, WMV, AVI, 3GO, Flash Video, etc. A location-based and/or satellite communications interface 406 may be provided in certain embodiments for effectuating satellite-based communications. Other I/O or interfaces may include one or more user interfaces 420 generally illustrative of a graphic user interface (GUI), touch-sensitive screen, keyboard, microphone, etc. Additionally, one or more USB/HDMI/DVI/FireWire ports 418 may be provided for effectuating connections to one or more external A/V devices for purposes of the present patent disclosure. Additional external device connectivity may be achieved via interfaces such as Ethernet I/F 408 as well as short-range and wide area wireless connectivity interfaces 412. In one implementation of the client device 400, a hard disk drive (HDD) system (not specifically shown) may be provided for mass storage of program assets such as A/V media, TV shows, movie titles, multimedia games, etc. Also included in the client/UE device 400 is a suitable power supply block 422, which may include AC/DC power conversion to provide power for the device 400. It should be appreciated that the actual power architecture for the client/UE device 400 may vary by the hardware platform used, e.g., depending upon the core SoC (System on Chip), memory, analog front-end, analog signal chain components and interfaces used in the specific platform, and the like.

For purposes of the present patent application, the stored program instructions embodied in the persistent memory 415 (e.g., Flash memory) of the client device 400 may include computer-readable instructions configured to perform one or more device-side processes, selectively in conjunction with other subsystems or logic blocks such as an ABR streaming client and decode logic 410 and EDID discovery/request mechanisms 404. As alluded to previously, an optional local or included display 413 may also be provided as part the client device 400 for rendering received content locally (for example, in a number of resolutions such as SD, ED or HD) in addition to operating as a touch-sensitive screen.

Figure 5:
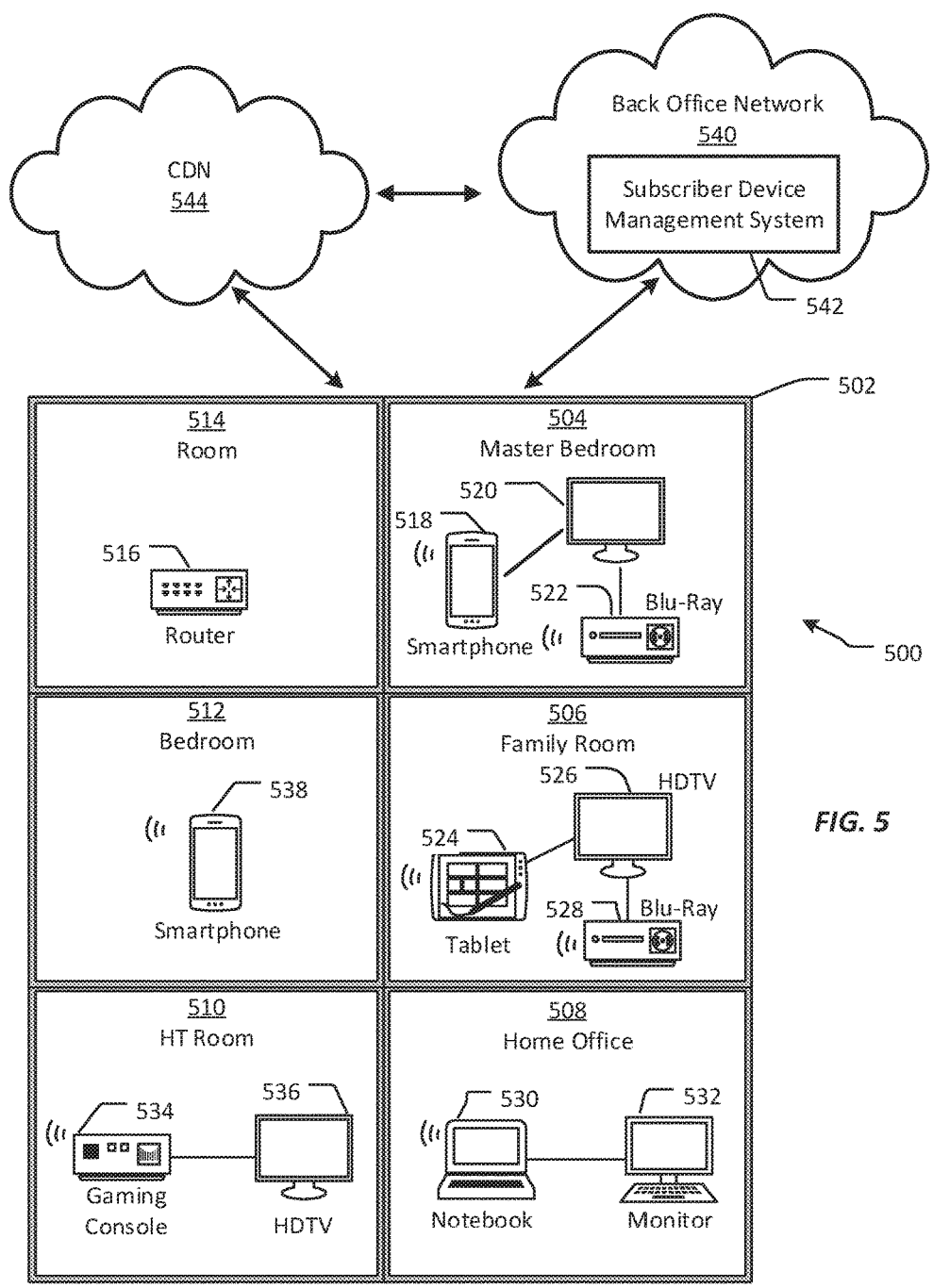
FIG. 5 depicts an example customer premises environment having a plurality of streaming client devices and connected audio/visual (A/V) devices wherein one or more embodiments of the present patent application may be practiced.

FIG. 5 depicts an example streaming network arrangement 500 including a customer premises environment 502, for example, a residence, that may contain a plurality of streaming client devices (fixed/wireline devices, untethered/wireless devices, or both) and connected audio/visual (A/V) devices wherein one or more embodiments of the present patent application may be practiced. A back office network 540 comprising a subscriber/device management system 542 and associated CDN 544 are roughly analogous to the ABR back office 122 and CDN 140 illustrated in FIG. 1. Customer premises 502 may includes multiple rooms, each having a subset of the devices wherein one or more devices may operate as streaming client devices that can interface with an external A/V device via wired or wireless means regardless of whether the A/V device is disposed in the same room or otherwise. By way of illustration, room 514 contains a router 516 for effectuating broadband connectivity with respect to the client devices and/or external A/V devices. A master bedroom 504 includes a smartphone 518 operable with a TV 520 and associated Blu-ray player 522. A family room 506 includes a tablet device 534 operable with a TV 526 and associated Blu-ray player 528. A home office 508 may include a notebook/desktop computer 530 and associated computer monitor 532. A home theater (HT) room 510 may include one or more gaming consoles 534 operable with associated display monitors 536. Likewise, a bedroom 512 may include a smartphone 538. It should be appreciated that smartphone(s) 518/538, tablet(s) 524, notebook(s) 530 and gaming console(s) 534 may operate as client devices that may receive streamed content for rendering locally or for decoding the streaming content to generate appropriate A/V signals that may be transmitted to a connected A/V device for rendering thereat. In addition, one or more TV monitors and Blu-ray players may comprise Internet connectivity and may include appropriate ABR streaming client functionality. In such an implementation, an external A/V device may also be capable of requesting content in addition to rendering it.

Figure 6:
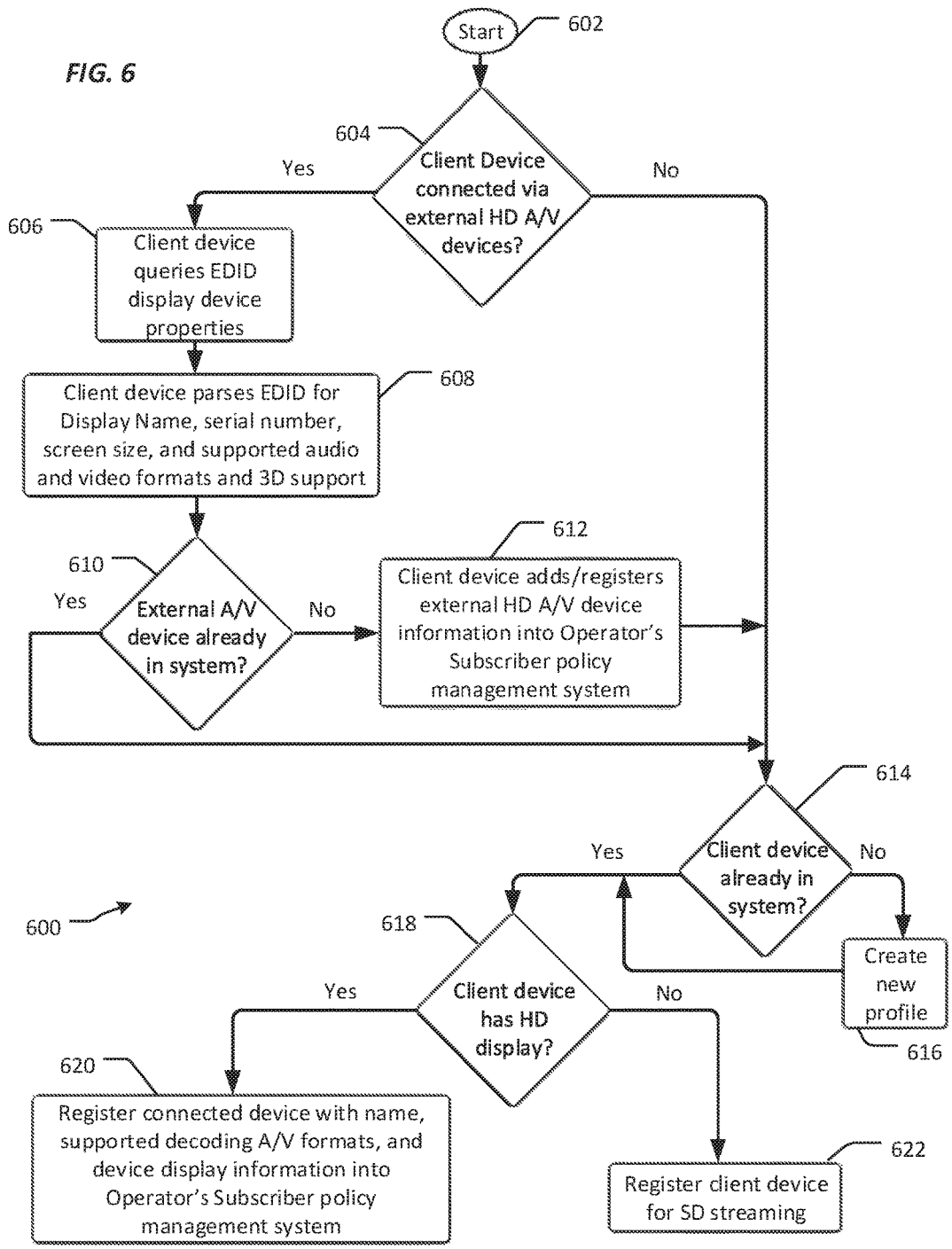
FIG. 6 depicts a flowchart with additional details relative to various steps and acts that may take place at a client device, streaming network back office, or both, for purposes of one or more embodiments of the present patent application.

FIG. 6 depicts a flowchart with additional details relative to various steps and acts that may take place at a client device (e.g., client device 102 or 400) or at a streaming network back office (e.g., back office 122), or both, for effectuating device registration according to one or more embodiments of the present patent application. Process flow 600 may start at a new client device or at a client device that has been previously configured in a back office subscriber/device policy management system (block 602). A decision block 604 is operative to determine if the client device is connected to any HD external devices. If there are no external HD devices connected to the client device, a further determination may be made if the client device is already in the back office system (block 614). If not, a new profile may be created for the client device (block 616). In one variation, if the client device does not have HD display capability (either via an included display or via a connected/external A/V device), the client device may be registered for streaming of low resolution content (e.g., SD) only (blocks 618 and 622).

If the client device is determined to have HD external devices (block 604), it may query the external devices for EDID information (block 606). Upon obtaining the EDID information, the client device may be configured to parse the information for various pieces of data such as display name, serial number, screen size and supported audio/video formats and any 3D capability (block 608). If the external A/V device information is not already present in the subscriber/device policy management system, that information is added to the system as set forth at blocks 610 and 612. It will be realized that the operations of blocks 610 and 612 are preconditioned on an existing client device and, therefore, decision blocks 614 and 618 may be bypassed in such an embodiment. Thereafter, the client device profile may be updated with registered external A/V device information, decoding/display capabilities, etc. for respective external devices along with updating subscriber preferences, priorities and weights (block 620). For example, a device profile may be updated to include a specific number of external A/V devices, their respective EDID data, weights for each client/AV device combination as well as a hierarchical/preference scheme when multiple A/V devices may be capable of rendering at equal or different resolutions.

Figure 7:
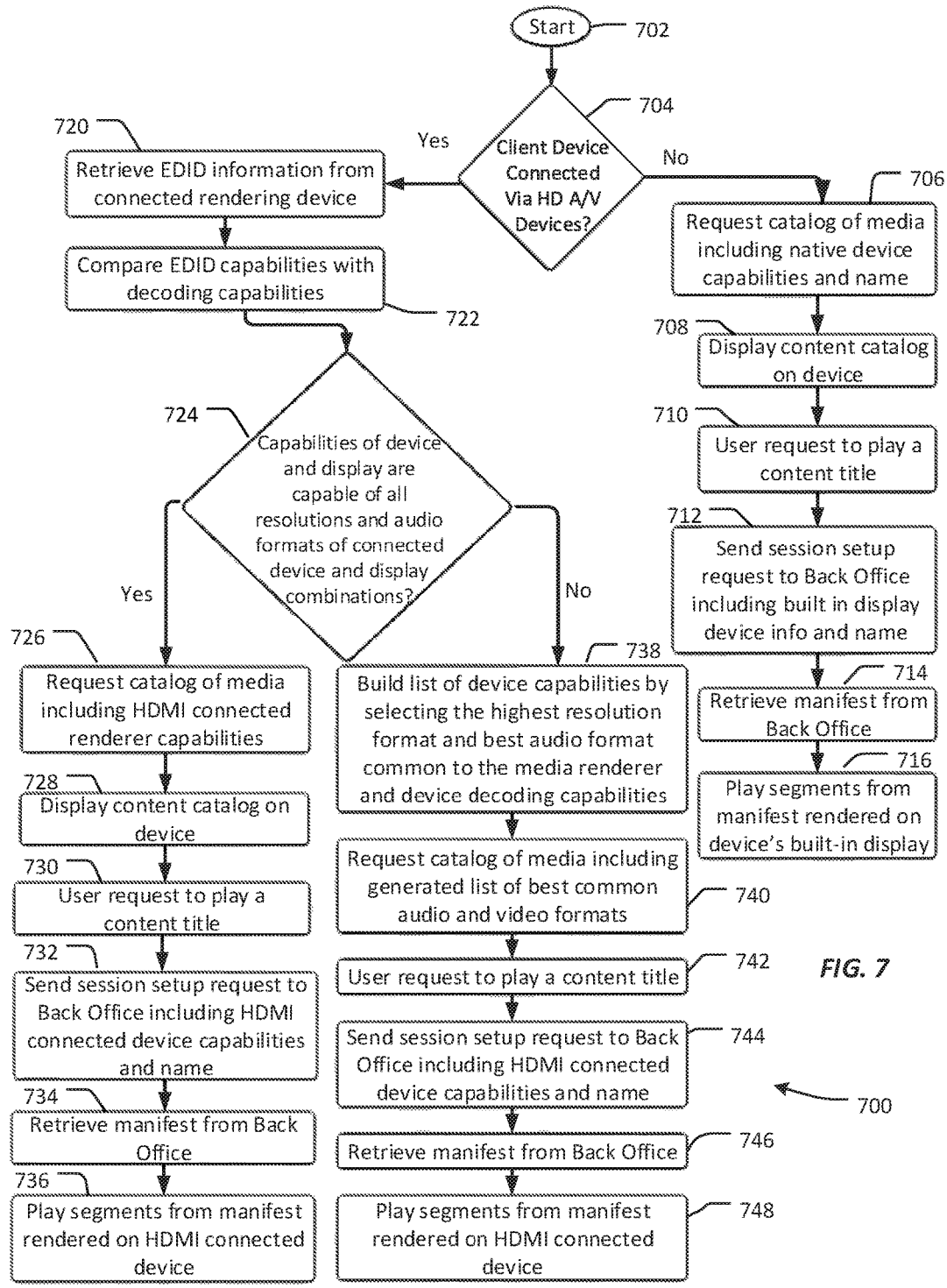
FIG. 7 depicts a flowchart with additional details relative to various steps and acts that may take place at a client device, streaming network back office, or both, for purposes of one or more embodiments of the present patent application.

FIG. 7 depicts a flowchart with additional details relative to various steps and acts that may take place at a client device (e.g., client device 102 or 400) or at a streaming network back office (e.g., back office 122), or both, for effectuating content requests and streaming of requested content according to one or more embodiments of the present patent application. As before, process flow 700 may start at a new client device or at a client device that has been previously configured in a back office subscriber/device policy management system (block 702). A decision block 704 is operative to determine if the client device is connected to any HD external devices via suitable wired or wireless means. Upon determining that there are no external HD devices connected to the client device, a catalog request for content/media files may be made by the client device, wherein the request may include native or internal display device information, e.g., display/decoding capabilities, identity, etc. (block 706). A catalog of appropriate content files that satisfy or otherwise compliant with the internal display device capabilities is provided to the client device, which may be displayed or otherwise presented to the user (block 708). Upon a user request to play a specific content file (i.e., title), a session setup request may be transmitted to the back office, including the internal/built-in display device information, as set forth at blocks 710, 712. An appropriate manifest file may be created pursuant to applicable ABR streaming technologies, which is received from the back office (block 714). Encoded media segments are then retrieved from the content provider based on the manifest file information for playback/rendering on the client device's built-in display (block 716).

If the client device is connected to one or more HD external devices as determined at decision block 704, appropriate EDID information may be obtained by the client device in accordance with one or more embodiments described hereinabove (block 720), whereupon the retrieved EDID information may be compared with the available decoding capabilities (block 722). If the decoding capabilities are compatible with all resolutions and audio formats of the external devices, including the various display/decoding combinations (decision block 724), a content/media catalog request for content having the highest or any combination of all resolutions compliant with the renderer capabilities may be made by the client device (block 726). Analogous to the operations set forth at blocks 708-714, blocks 728-734 describe operations for obtaining content titles having compatible resolutions (higher resolutions, in this case), selecting a particular content title, and obtaining suitable manifest files with location information pointing to higher resolution content segments for playback/rendering at a select display device (a connected HD A/V device, in this case). Accordingly, the retrieved HD content segments are rendered at the connected HD A/V device (e.g., an HDMI device) instead of being rendered at the client device's built-in display (block 736).

On the other hand, where there is an overlap or variance between the decoding capabilities and rendering functionalities, a list of device/display capabilities having common set of compliant resolutions and formats may be created (block 738). Thereafter, a suitable catalog request may be generated wherein the list of device/display combinations having common capabilities is transmitted (block 740). Blocks 742-748 describe operations similar to the operations set forth at blocks 730-736, whereby content segments of suitable resolution may be rendered at an external HD device.

It should be realized that in an additional or alternative embodiment, the client device may include an indication of renderer device preferences along with the external device information. Further, as the capabilities of external renderer devices are supplemented or modified, the user may dynamically select or configure different external A/V devices, for example, based on different content types, user preferences, scheduling choices, etc., for rendering content, which selections and configurations are operative to provide an input to the provisioning and scheduling of appropriate bandwidth with respect to establishing suitable content distribution pipes to the user.

Figure 8:
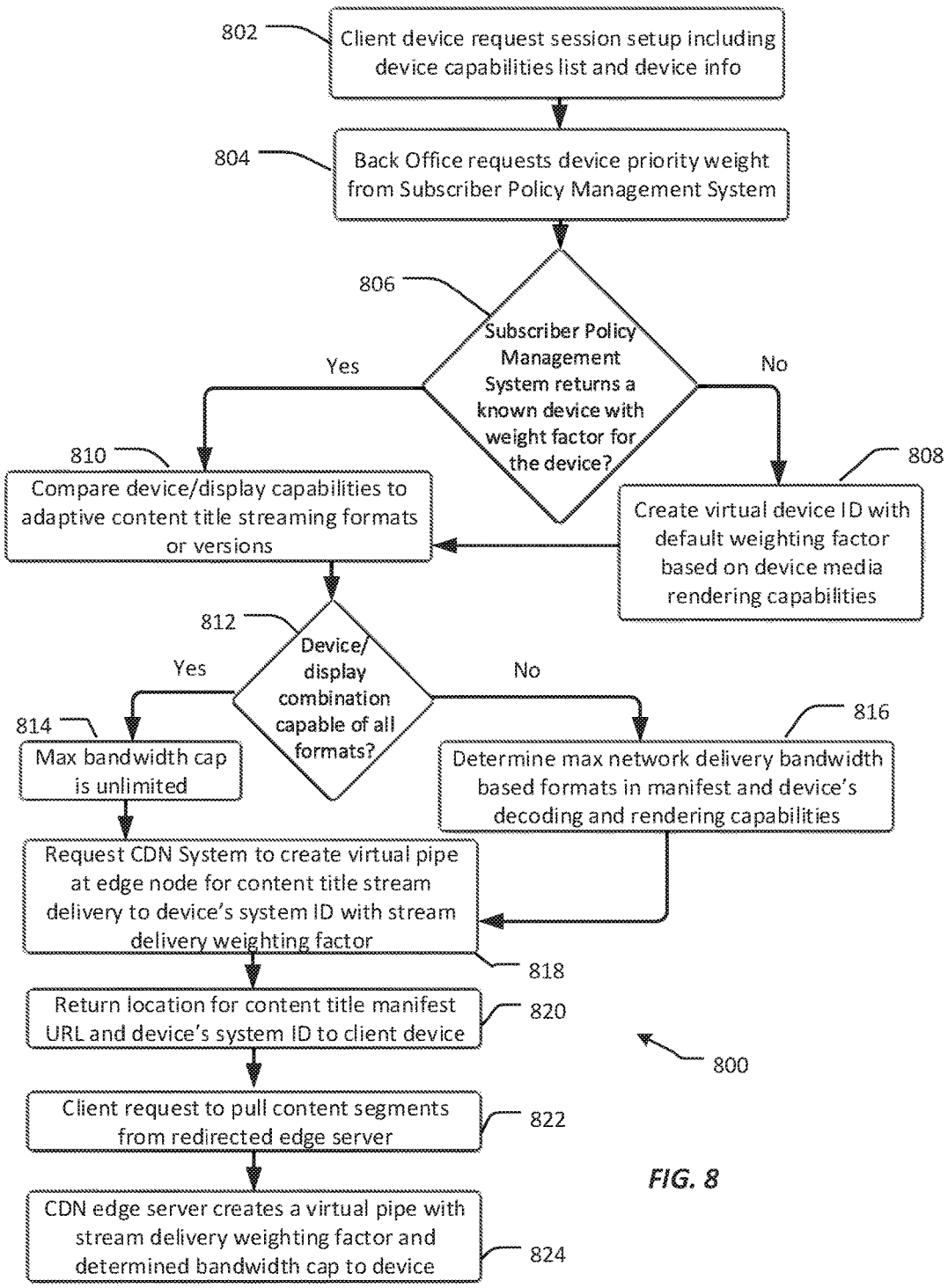
FIG. 8 depicts a flowchart with additional details relative to various steps and acts that may take place at a client device, streaming network back office, or both, for purposes of one or more embodiments of the present patent application.

Turning to FIG. 8, depicted therein is a flowchart with additional details relative to various steps and acts that may take place at a client device (e.g., client device 102 or 400) or at a streaming network back office (e.g., back office 122), or both, for effectuating a streaming session setup flow 800 according to one or more embodiments of the present patent application. At block 802, the client device generates a session setup request including a device capabilities list, A/V device list and other information. Upon receipt of the session setup request from the client device, the streaming network back office generates a request for (or otherwise obtains) a device priority weight from the associated subscriber policy management system (block 804). If the client device is determined to be a "known" device with a preconfigured weight factor (e.g., having a device profile previously established), a comparison may be made with respect to the device/display capabilities and the requested content's streaming formats or versions (blocks 806 and 810). Otherwise, a virtual device identity and associated device profile may be created based on the new device's media rendering capabilities, including, e.g., a default weighting factor (block 808). If the device/display capabilities combination is compatible with all streaming formats (decision block 812), an unlimited or maximum bandwidth capacity may be scheduled for delivering the highest resolution content available (block 814). Otherwise, a limited network delivery bandwidth may be determined (e.g., a maximum bandwidth) for the formats compatible with the device/display combination's decoding and rendering capabilities (block 816). Thereafter, a request is made to the associated CDN system to create a virtual pipe at an edge node operable to serve the client device for effectuating content stream delivery based on the weight factors (block 818). A manifest location URL along with the device ID is returned to the client device (block 820), whereupon the client device is operative to request for the encoded content segments from the edge server, which in some embodiments may comprise a redirected edge server (block 822). A virtual pipe is created at the CDN edge server based on the stream delivery weighting factor and determined bandwidth capacity (and any maximum caps, if applicable) as set forth at block 824.

Figure 9:
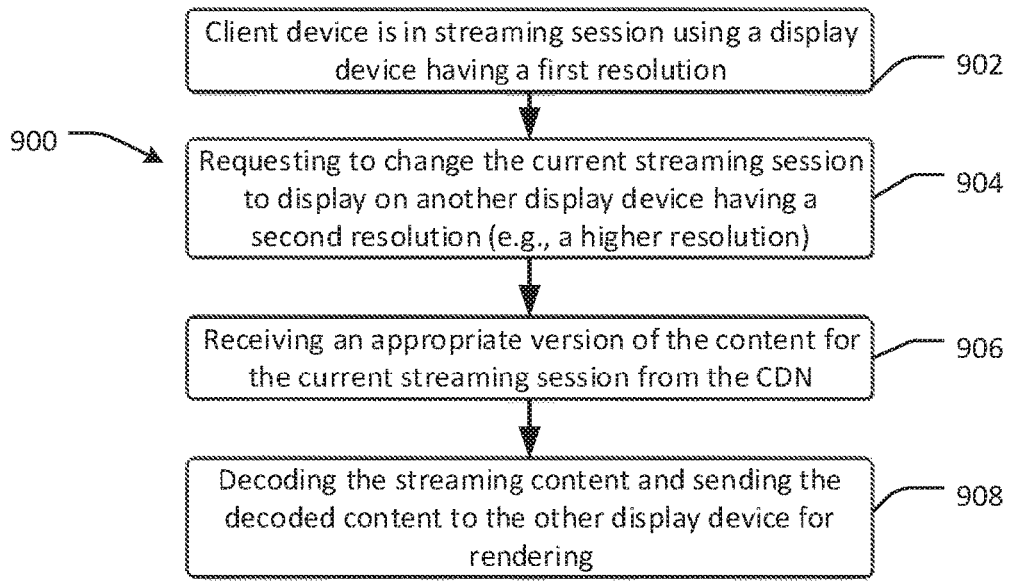
FIG. 9 depicts a flowchart with additional details relative to various steps and acts that may take place at a client device, streaming network back office, or both, for purposes of one or more embodiments of the present patent application.

FIG. 9 depicts a flowchart with additional details relative to various steps and acts that may take place at a client device (e.g., client device 102 or 400) or at a streaming network back office (e.g., back office 122), or both, for effectuating dynamic redirection of a streaming session, shown generally at reference numeral 900, in accordance with an embodiment of the present patent application. At block 902, the client device is in a streaming session using a display device having a first resolution, which may be either an included display device or an external A/V device. During the ongoing streaming session, the client device requests to change the current rendering device to another device having a second resolution (e.g., having a higher resolution than the first resolution) (block 904). In one scenario, the client device may change the current rendering device because a high resolution A/V device might have become available (e.g., watching a streamed program on the included display of the client device while away from home but connecting to a HD display upon coming home). The back office is operative to select or otherwise determine another optimum version of the requested content (e.g., higher resolution) and provide an updated manifest file and associated URL locations to the client device, whereupon the client device is operative to receive or otherwise retrieve the content segments that may be decoded into signals suitable for rendering at the other A/V device having the second resolution (blocks 906 and 908).

Figure 10:
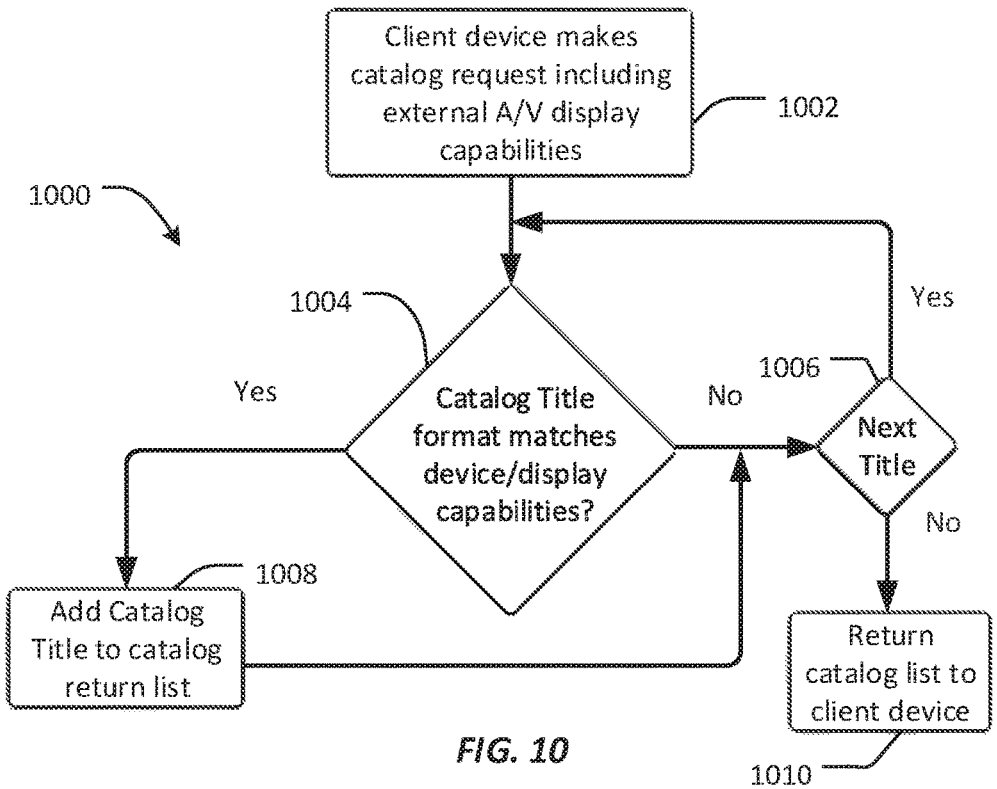
FIG. 10 depicts a flowchart of an example catalog management process according to an embodiment of the present patent disclosure.

FIG. 10 depicts a flowchart of an example catalog or content guide management process 1000 according to an embodiment of the present patent disclosure. At block 1002, a streaming client device (e.g., client device 102 or 400) generates a catalog request to the associated back office infrastructure 122 wherein the request may comprise a request for content titles from one or more providers and includes a list of external A/V devices connected thereto and their respective capabilities. Upon receiving the catalog request, the back office 122 performs a determination with respect to all available content titles from the content provider(s) as to whether a particular content title's format matches the device/display capabilities, including the capabilities of the external A/V devices (decision block 1004). If so, the content title is added to a catalog return list (block 1008). Otherwise, the particular content title is skipped and the next available title is examined (blocks 1006 and 1004). After all available content titles have been examined, a cumulative catalog return list (e.g., a content guide) is returned to the client device (1010). In one example scenario, where the catalog request comprises a request for all 3D titles, the catalog return list comprises only 3D titles. Likewise, where the catalog request comprises a request for HD content, the catalog return list comprises only HD titles. One skilled in the art will recognize upon reference hereto that the example catalog request process may be further modulated based on a number of factors, e.g., device manufacturer, form factor, screen aspect ratio, as well as content-specific factors, etc.

Figure 11:
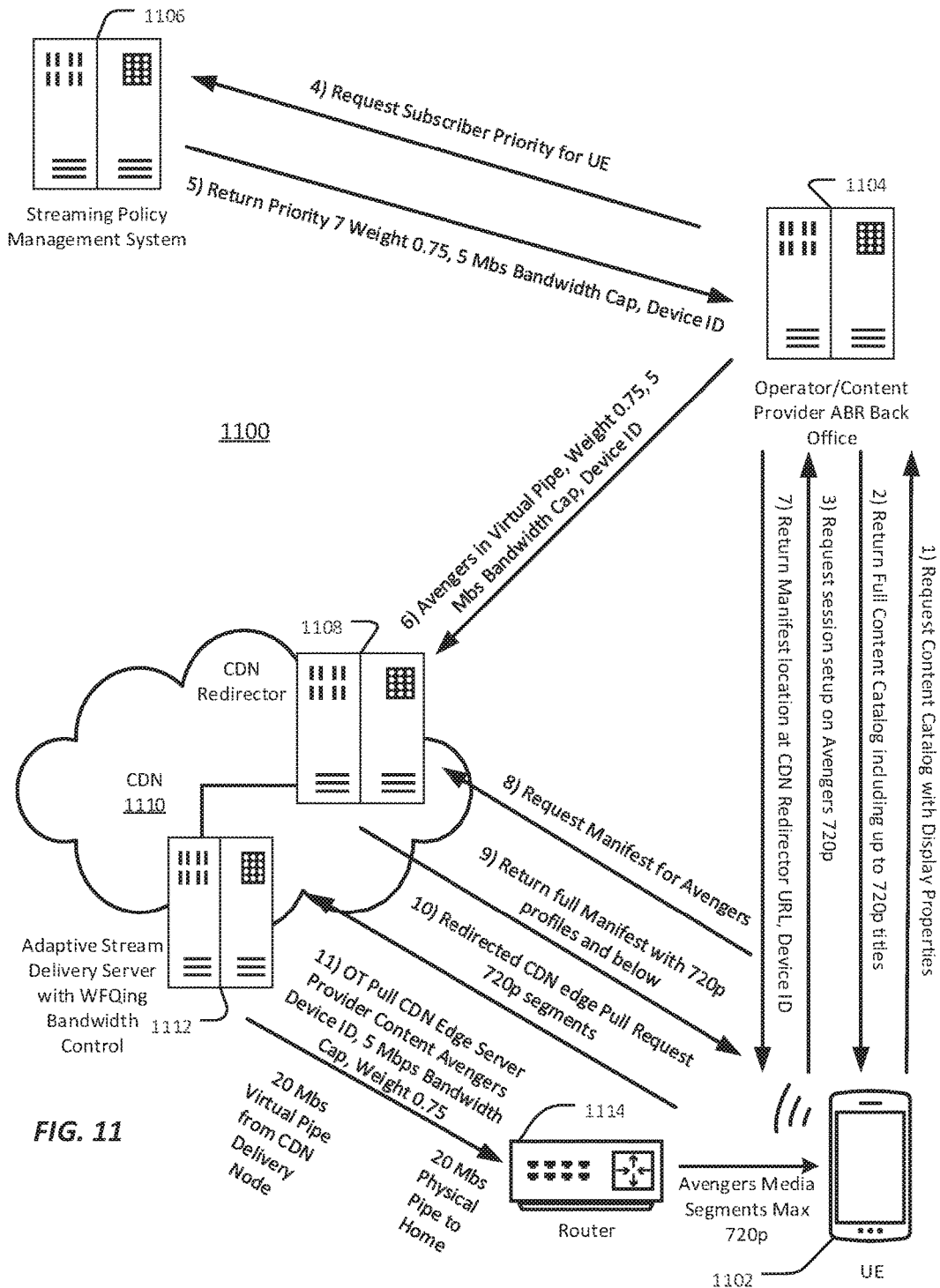
FIGS. 11 and 12 depict example streaming network environments wherein a client device receives streaming content at lower and higher resolution capacities, respectively, based on the display device capabilities according to an embodiment of the present patent application.
Figure 12:
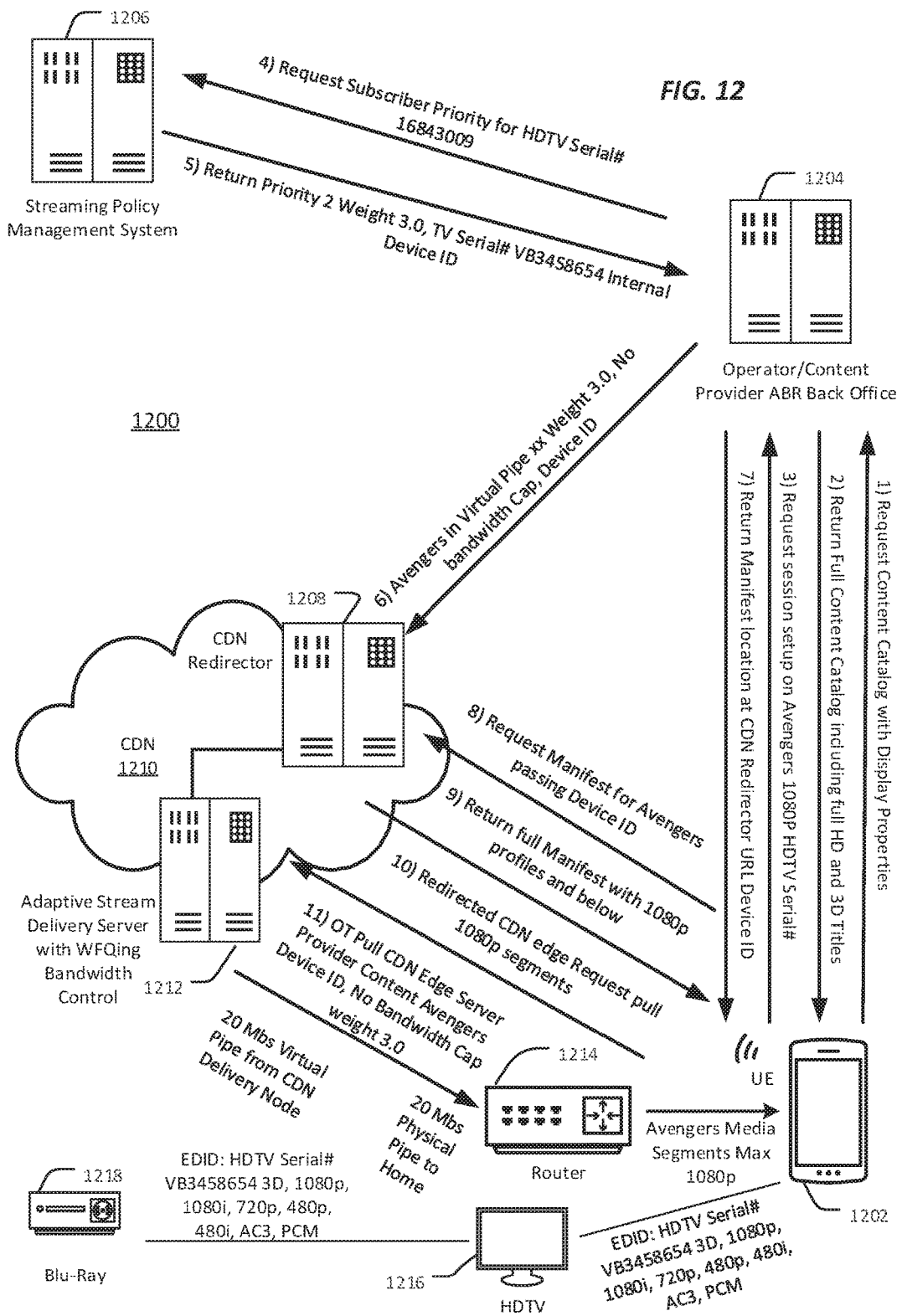

FIGS. 11 and 12 depict example streaming network arrangements wherein a client device receives streaming content at lower and higher bandwidth rates, respectively, based on the display device capabilities according to one or more embodiments of the present patent application. In particular, reference numeral 1100 in FIG. 11 refers to an example streaming network arrangement where a streaming client device, e.g., UE 1102, is not connected to an external HD A/V device. Message flows that take place among a plurality of entities with respect to a subscriber request for a particular content (e.g., Avengers) from UE device 1102 are exemplified by numerals (1) to (11), as will be described in detail. The client UE device 1102 may initially make a catalog request (1) that includes the display properties of the built-in display of UE 1102. Based on the received device/display capabilities information, the operator/content provider ABR back office 1104 returns (2) a full content catalog of titles including up to 720 p resolution. Thereafter, a particular content (e.g., Avengers) is requested (3), which is processed by the back office 1104 to generate a request (4) to a streaming policy management system 1106 with respect to an applicable streaming policy, including subscriber priority, associated with UE 1102. The streaming policy management system 1106 returns a response (5) to the back office 1104 including a priority level, assigned weight, a bandwidth cap determination (e.g., 5 Mbps), along with the internal device ID information. Responsive to the policy information received from the policy management system 1106, a request (6) is generated to a CDN redirector node 1108 disposed in CDN 1110, to provision a virtual pipe for the requested content. Additionally, a manifest location along with the redirector URL and internal device ID is returned (7) to UE 1102. In response, UE 1102 generates a request (8) for the manifest file to the CDN redirector node 1108, which returns (9) a full manifest file with profiles up to and including 720 p resolution. It should be appreciated that even where a manifest file with profiles of higher resolution are provided (e.g., 1080 p), UE device 1102 may be configured to generate a pull request for the lower resolutions only. Based on the manifest file information (e.g., encoding rates used for encoding the content, pointers to the segments/chunks into which the encoded content is divided, etc.), UE 1102 generates a pull request (10) to an edge server 1112 for the 720 p segments, whereupon a virtual pipe with a 5 Mbps bandwidth capacity and weight of .75 (based on the information received in the provisioning request (6)) is established to a premises router 1114 associated with UE 1102. Media segments for the particular content, i.e., Avengers, are streamed to UE 1102 for rendering at the local/included display in 720 p resolution.

Turning to FIG. 12, in particular, reference numeral 1200 refers to an example streaming network arrangement where a streaming client device, e.g., UE 1202, having connectivity to an external HD A/V device 1216 is exemplified. By way of further illustration, the external HD A/V device 1216 is provided as an HDTV capable of 1080 p resolution (as well as any lower resolutions) and coupled to a BD player 1218. It should be appreciated that aside from the external HD connectivity and transmission of appropriate EDID information to the operator/content back office 1204 for subsequent processing, the message flows (1) to (11) illustrated in FIG. 12 are substantially analogous to the flows with respect to a subscriber request for a particular content (e.g., Avengers) described above in reference to FIG. 11. Accordingly, analogous to the scenario shown in FIG. 11, the client UE device 1202 may initially make a catalog request (1) that includes the connected HD A/V display properties, device identity information, etc. as previously described. Based on the received device/display capabilities information, the operator/content provider ABR back office 1204 returns (2) a full content catalog of titles including up to full 1080 p resolution as well as any 3D content titles. Thereafter, a particular content (e.g., Avengers) in high resolution is requested (3) in a session setup request, wherein a serial number of the external HDTV 1216 may be included. The session setup request is processed by the back office 1204 to generate a request (4) including the external HDTV serial number to a streaming policy management system 1206 with respect to an applicable streaming policy, including subscriber priority, associated with UE 1202. The streaming policy management system 1206 returns a response (5) to the back office 1204 including suitable priority and assigned weight information, along with the internal device ID information and/or associated HDTV serial number information. It should be noted that whereas the streaming policy information in this scenario includes a higher weight factor, it may not necessarily include a bandwidth capacity limitation. Responsive to the policy information received from the policy management system 1206, a request (6) is generated to a CDN redirector node 1208 disposed in CDN 1210, to provision a virtual pipe for the requested content. Additionally, a manifest location along with the redirector URL and internal device ID is returned (7) to UE 1202. In response, UE 1202 generates a request (8) for the manifest file to the CDN redirector node 1208, which returns (9) a full manifest file with profiles up to and including 1080 p resolution. In response to the manifest file information, UE 1202 generates a pull request (10) to an edge server 1112 for the 1080 p segments, whereupon a virtual pipe with no bandwidth capacity limitation and weight of 3.0 (based on the information received in the provisioning request (6)) is established to a premises router 1214 associated with UE 1202. Media segments for the particular content, i.e., Avengers, are streamed to UE 1202 for rendering at the external HDTV display 1216 in full 1080 p resolution.

Based upon the foregoing Detailed Description, it should be appreciated that at least some of the embodiments of the present disclosure can be advantageously implemented to optimize CDN bandwidth for the clients requesting adaptive streaming or file-based content depending upon the external A/V devices that may connected to the client device. For example, in the case of an adaptive streaming set-top box (STB) operating as a client device, a subscriber policy manager could be automatically provisioned for the TV monitor that the STB is connected to rather than the STB itself. Further, even if a small form-factor client device such as a smartphone or tablet is capable of HD display, an operator might not want to waste bandwidth by streaming high resolution segments only to be rendered locally since the client device is not connected to a large form-factor HD display device (e.g., a 70-inch HDTV). Accordingly, one or more embodiments of the present disclosure are operative to ensure that correct/appropriate content streams are delivered for rendering at the actual rendering devices while conserving the bandwidth (e.g., by reducing inefficient bandwidth usage) in the delivery network.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

As alluded to previously, tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, microcode, etc.) that runs on a processor such as a digital signal processor, which may collectively be referred to as "circuitry," "a module" or variants thereof.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction relative to the depicted arrows.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. An adaptive streaming method for delivering content to a streaming client device, the method comprising:
   receiving a request from the streaming client device for delivery of a particular content, wherein the request includes external device information of one or more external audio/visual (A/V) devices connected to the streaming client device and the particular content is available in a plurality of versions encoded at different bit rates;
   determining, based at least in part upon the external device information, a bandwidth for streaming the particular content to the streaming client device;
   requesting a content delivery network to create a distribution pipe having the bandwidth to accommodate the delivery of the particular content to the streaming client device; and
   providing a manifest file to the streaming client device, the manifest file including encoding bit rates and one or more pointers that point to content segments of the particular content.

2. The method as recited in claim 1, further comprising assigning a specific priority weight with respect to streaming the particular content to the streaming client device based at least in part upon the external device information.

3. The method as recited in claim 1, further comprising determining an appropriate version of the particular content to be delivered to the streaming client device based at least in part upon the external device information.

4. The method as recited in claim 1, wherein the external device information comprises External Display Identification Data (EDID) information of the one or more external A/V devices connected to the streaming client device.

5. The method as recited in claim 4, wherein the EDID information of an external A/V device comprises the A/V device's manufacturer name, serial number, product type, phosphor type, filter type, supported A/V decoding and format information, display timing information, display screen size, display screen aspect ratio, luminance data and pixel mapping data.

6. The method as recited in claim 1, wherein the request further includes an indication that the particular content will be rendered at a specific external A/V device having a first resolution capacity.

7. The method as recited in claim 6, further comprising determining an optimum version of the particular content for delivery to the streaming client device based on further determining that the specific external A/V device is operative in combination with the streaming client device of rendering the optimum version.

8. The method as recited in 6, further comprising:
if there is a subsequent request from the streaming client device to change a current streaming session to be rendered at another external A/V device having a second resolution capacity, selecting another optimum version of the particular content for rendering at the second resolution capacity; and
providing an updated manifest file to the streaming client device that includes one or more pointers that point to content segments of the other optimum version of the particular content.

* * * * *